United States Patent
Kamiya

(10) Patent No.: US 11,044,853 B2
(45) Date of Patent: Jun. 29, 2021

(54) HEDGE TRIMMER

(71) Applicant: MAKITA CORPORATION, Anjo (JP)

(72) Inventor: Takahiro Kamiya, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 16/266,316

(22) Filed: Feb. 4, 2019

(65) Prior Publication Data

US 2019/0239446 A1   Aug. 8, 2019

(30) Foreign Application Priority Data

Feb. 5, 2018   (JP) .............................. JP2018-018524

(51) Int. Cl.
*A01G 3/053*   (2006.01)
*A01G 3/04*   (2006.01)

(52) U.S. Cl.
CPC ...... *A01G 3/053* (2013.01); *A01G 2003/0461* (2013.01)

(58) Field of Classification Search
CPC ............ A01G 2003/0461; A01G 3/053; A01G 3/047–053
USPC .................................. 30/208–210, 215–220
See application file for complete search history.

(56) References Cited

U.S. PATENT DOCUMENTS

| 3,774,302 | A | * | 11/1973 | Ketchpel, Jr. .......... | A01G 3/067 30/210 |
| 3,971,130 | A | * | 7/1976 | Querfurth .............. | A01G 3/067 30/220 |
| 4,104,795 | A | * | 8/1978 | Lopic ..................... | A01G 3/053 30/DIG. 1 |
| 4,593,241 | A | * | 6/1986 | Eulenberg .............. | G01R 19/32 323/294 |
| 4,833,650 | A | * | 5/1989 | Hirayama ........... | G11C 11/4096 365/225.7 |
| 5,675,896 | A | * | 10/1997 | Aiyama ................. | A01G 3/053 30/216 |
| 5,697,258 | A | * | 12/1997 | Aiyama ................. | A01G 3/053 30/216 |
| 5,867,910 | A | * | 2/1999 | Stegall ................... | A01G 3/053 30/216 |
| 7,159,322 | B2 | * | 1/2007 | Sasaki .................... | A01G 3/053 16/110.1 |
| 8,765,280 | B2 | * | 7/2014 | Ueda ................... | H01M 2/1055 30/500 |

(Continued)

FOREIGN PATENT DOCUMENTS

| DE | 102019000674 A1 * | 8/2019 | ............. A01G 3/053 |
| EP | 2540153 B1 * | 8/2016 | ............. A01G 3/053 |

(Continued)

*Primary Examiner* — Jason Daniel Prone
(74) *Attorney, Agent, or Firm* — Sughrue Mion, PLLC

(57) ABSTRACT

A hedge trimmer may include a housing provided with a handle configured to be gripped by a user, a pair of shear blades extending forward from the housing; a motor housed in the housing and configured to drive at least one of the pair of shear blades; and an electric circuit unit housed in the housing and configured to control power supplied to the motor. The handle may be provided at an upper portion of the housing in rear of the motor, and the electric circuit unit may be located under the handle in the rear of the motor.

13 Claims, 4 Drawing Sheets

(56) References Cited

U.S. PATENT DOCUMENTS

| | | | |
|---|---|---|---|
| 8,813,733 B2 * | 8/2014 | Tamura | A01G 3/047 123/630 |
| 8,833,485 B2 * | 9/2014 | Svennung | B25F 5/00 173/2 |
| 9,308,637 B2 * | 4/2016 | Tsuchiya | A01G 3/053 |
| 9,314,914 B2 * | 4/2016 | Suda | B25F 5/026 |
| 9,555,537 B2 * | 1/2017 | Iwata | B25F 5/001 |
| 9,603,311 B2 * | 3/2017 | Wang | A01G 3/053 |
| 9,877,435 B2 * | 1/2018 | Li | A01G 3/053 |
| 9,943,039 B2 * | 4/2018 | Rosskamp | A01G 3/053 |
| 9,978,541 B2 * | 5/2018 | Mizutani | H02K 7/14 |
| 10,433,491 B2 * | 10/2019 | Li | A01G 3/053 |
| 2007/0267990 A1 * | 11/2007 | Abolhassani | H02P 21/0089 318/432 |
| 2009/0096401 A1 * | 4/2009 | Watabe | B25F 5/00 318/446 |
| 2009/0241350 A1 * | 10/2009 | Lau | B25F 5/02 30/199 |
| 2010/0281697 A1 * | 11/2010 | Tate | A01G 3/053 30/312 |
| 2010/0307782 A1 * | 12/2010 | Iwata | B25F 5/00 173/1 |
| 2011/0162219 A1 * | 7/2011 | Okouchi | B27B 17/00 30/383 |
| 2012/0023761 A1 * | 2/2012 | Martinsson | A01G 3/053 30/381 |
| 2014/0047719 A1 * | 2/2014 | Shimizu | A01G 3/053 30/216 |
| 2014/0190713 A1 * | 7/2014 | Martinsson | A01G 3/053 30/381 |
| 2017/0276572 A1 * | 9/2017 | Chen | G01M 99/005 |
| 2018/0325035 A1 * | 11/2018 | Chung | F16H 3/66 |
| 2019/0239445 A1 * | 8/2019 | Iwase | A01G 3/0535 |
| 2020/0196533 A1 * | 6/2020 | Wu | A01G 3/053 |

FOREIGN PATENT DOCUMENTS

| | | | | |
|---|---|---|---|---|
| GB | 2492886 A | * | 1/2013 | ............ A01G 3/053 |
| JP | 2014-233778 A | | 12/2014 | |
| JP | 2019134693 A | * | 8/2019 | ............ A01G 3/053 |

* cited by examiner

HEDGE TRIMMER

CROSS-REFERENCE

This application claims priority to Japanese Patent Application No. 2018-018524, filed on Feb. 5, 2018, the entire contents of which are incorporated herein by reference.

TECHNICAL FIELD

The disclosure herein relates to a hedge trimmer that is used mainly to trim hedges and plants.

TECHNICAL FIELD

Japanese Patent Application Publication No. 2014-233778 describes a hedge trimmer. This hedge trimmer includes a housing provided with a handle configured to be gripped by a user, a pair of shear blades extending forward from the housing, a motor housed in the housing and configured to drive the pair of shear blades, and an electric circuit unit housed in the housing and configured to control power supplied to the motor.

SUMMARY

A hedge trimmer is a handheld-type electric power tool, and operability thereof greatly varies depending on its size and weight balance. In view of this, the disclosure herein provides a technique capable of improving operability of a hedge trimmer.

The disclosure herein discloses a hedge trimmer of an embodiment. This hedge trimmer may comprise a housing comprising a handle configured to be gripped by a user; a pair of shear blades extending forward from the housing; a motor housed in the housing and configured to drive at least one of the pair of shear blades; and an electric circuit unit housed in the housing and configured to control power supplied to the motor. The handle may be provided at an upper portion of the housing in rear of the motor, and the electric circuit unit may be located under the handle in the rear of the motor.

In the hedge trimmer described above, the pair of shear blades, the motor, the handle and the electric circuit unit are appropriately arranged, by which operability of the hedge trimmer is significantly improved. In particular, the electric circuit unit is located under the handle in the rear of the motor. According to such a configuration, the hedge trimmer easily becomes stable by a weight of the electric circuit unit, and a user who is gripping the handle can easily operate the hedge trimmer.

DETAILED DESCRIPTION

Figure 1:
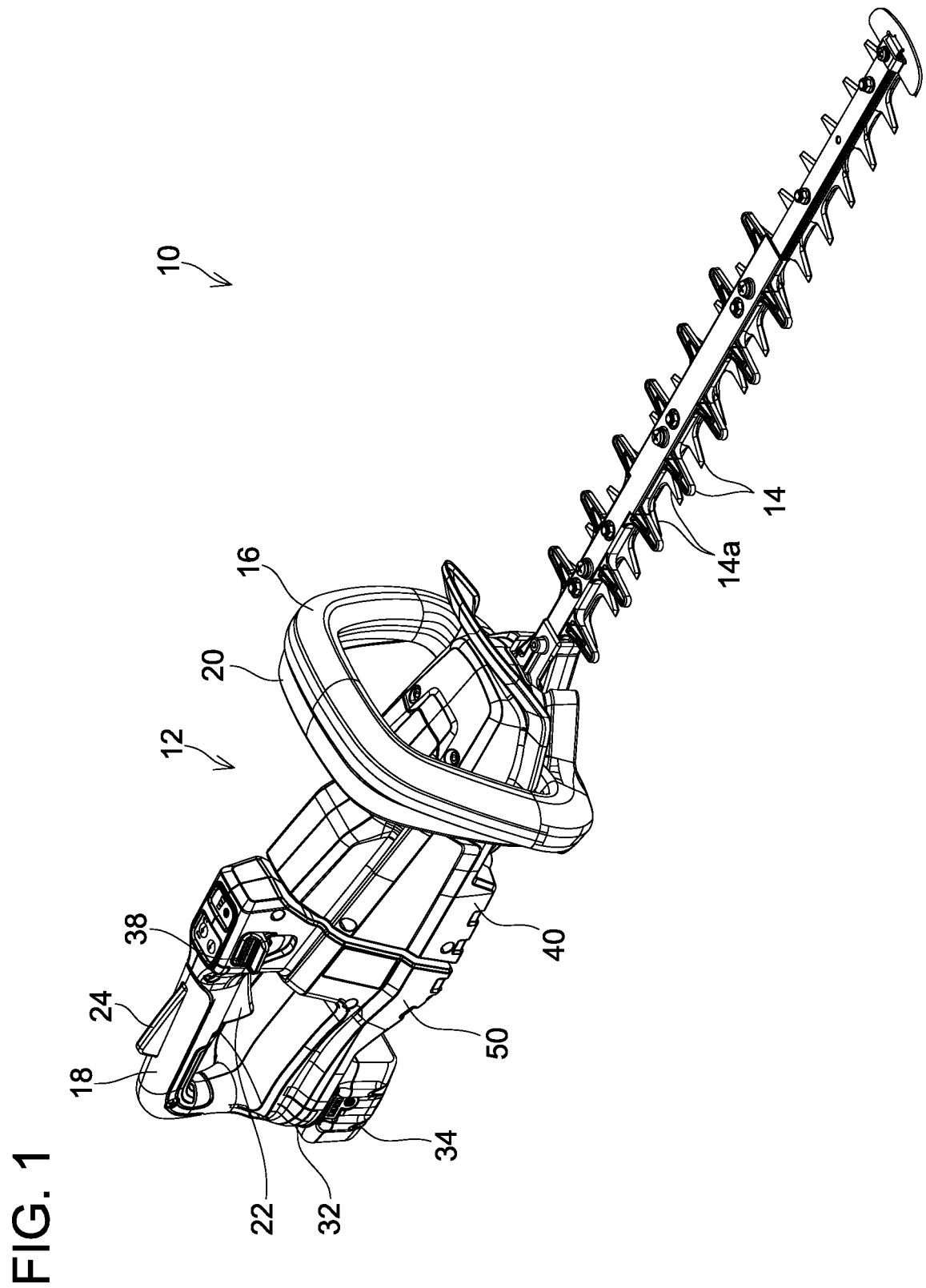
FIG. 1 is a perspective view showing an exterior appearance of a hedge trimmer 10 of an embodiment.

In an embodiment, the housing may comprise a first housing and a second housing rotatably connected to the first housing. In this case, the first housing may support the pair of shear blades and house the motor. The second housing may comprise the handle and house the electric circuit unit. That is, the technique disclosed herein, especially the configuration in which the electric circuit unit is located under the handle, can be employed in a hedge trimmer including a single housing as well as in a swing-type hedge trimmer including two or more housings.

In the embodiment above, the pair of shear blades may extend forward from the first housing. Further, the second housing may be located in rear of the first housing. In this case, a rotation axis of the second housing with respect to the first housing may be parallel to a longitudinal direction of the pair of shear blades (i.e., a front-rear direction), or may be angled thereto.

In the embodiment above, the electric circuit unit may be located on a rearward extension line of the pair of shear blades. According to such a configuration, the electric circuit unit is disposed near a bottom wall of the housing, by which the hedge trimmer becomes more stable by the weight of the electric circuit unit.

In the embodiment above, the electric circuit unit may be arranged so as to incline with respect to the extension line. According to such a configuration, a size of the housing in the front-rear direction can be made small.

In an embodiment of the technique disclosed herein, the hedge trimmer may further comprise a battery interface electrically connected to the electric circuit unit and configured to detachably receive a battery pack. In this case, the battery interface may be located at a lower portion of the second housing. According to such a configuration, the hedge trimmer becomes stable easily by a weight of the battery pack, and the user who is gripping the handle can easily operate the hedge trimmer.

In an embodiment of the technique disclosed herein, the hedge trimmer may further comprise a cooling fan housed in the first housing and configured to be driven by the motor, and a cooling air passage extending from an air intake provided in the second housing to the cooling fan. In this case, the cooling air passage may house at least a part of the electric circuit unit. According to such a configuration, the electric circuit unit housed in the second housing can be cooled by the cooling fan housed in the first housing.

In an embodiment of the technique disclosed herein, the motor may be a brushless motor. In this case, the electric circuit unit may comprise an inverter circuit electrically connected to the brushless motor. In another embodiment, the motor may be a DC motor including a brush or another rectifier, or may be a motor with another structure.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved hedge trimmers, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Figure 2:
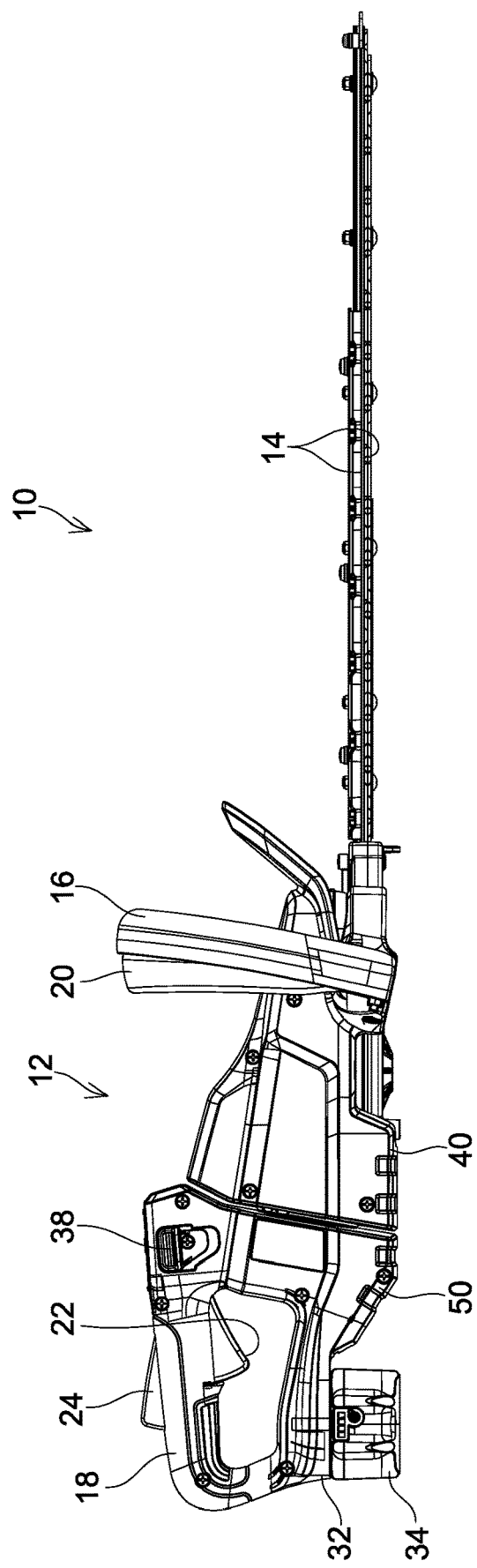
FIG. 2 is a side view showing the exterior appearance of the hedge trimmer 10 of the embodiment.

With reference to the drawings, a hedge trimmer 10 of an embodiment will be described. The hedge trimmer 10 is a gardening tool used mainly to trim hedges and plants. As shown in FIGS. 1 and 2, the hedge trimmer 10 comprises a housing 12 and a pair of shear blades 14 extending from the housing 12.

The pair of shear blades 14 linearly extends forward (toward right in FIG. 2) from the housing 12 and includes a plurality of cutting edges 14a along its longitudinal direction. The shear blades 14 are configured to be reciprocated to each other to trim hedges and plants by the plurality of cutting edges 14a. In the hedge trimmer 10 of the present embodiment, both of the shear blades 14 in the pair are configured to be reciprocated. However, in another embodiment, only one of the shear blades 14 in the pair may be configured to be reciprocated.

In the disclosure herein, the longitudinal direction of the pair of shear blades 14 is defined as a front-rear direction, where direction from the housing 12 toward the pair of shear blades 14 is defined as forward (front) and a direction from the pair of shear blades 14 toward the housing 12 is defined as rearward (rear). Further, a direction that is vertical to the front-rear direction and is parallel to a plane on which the plurality of cutting edges 14a is located is defined as a right-left direction. Then, a direction that is vertical to both of the front-rear direction and the right-left direction is defined as an up-down direction, where a direction from the housing 12 toward the pair of shear blades 14 is defined as downward (under) and a direction from the pair of shear blades 14 toward the housing 12 is defined as upward (above).

The housing 12 comprises a front handle 16 and a rear handle 18. The front handle 16 is located at a front portion of the housing 12, and the rear handle 18 is located at a rear portion of the housing 12. The front handle 16 and the rear handle 18 are configured to be gripped by a user. The hedge trimmer 10 is a handheld-type electric power tool, and the user usually grips the front handle 16 with his/her left hand and grips the rear handle 18 with the right hand to operate the hedge trimmer 10. The front handle 16 extends along a plane angled with respect to the front-rear direction, and the rear handle 18 extends along a plane parallel to both the front-rear direction and the up-down direction (i.e., a plane that is vertical to the right-left direction), although this is merely an example.

The front handle 16 is provided with a first drive switch 20, and the rear handle 18 is provided with a second drive switch 22. The rear handle 18 is further provided with a lock switch 24. The hedge trimmer 10 is configured to drive the pair of shear blades 14 only while the first drive switch 20 and the second drive switch 22 are both simultaneously manipulated. Further, the second drive switch 22 is mechanically locked by the lock switch 24 usually and is configured to be allowed to be manipulated only while the lock switch 24 is manipulated. With these configurations, the hedge trimmer 10 is configured to prohibit driving the pair of shear blades 14 unless the user grips both of the front handle 16 and the rear handle 18.

Figure 3:
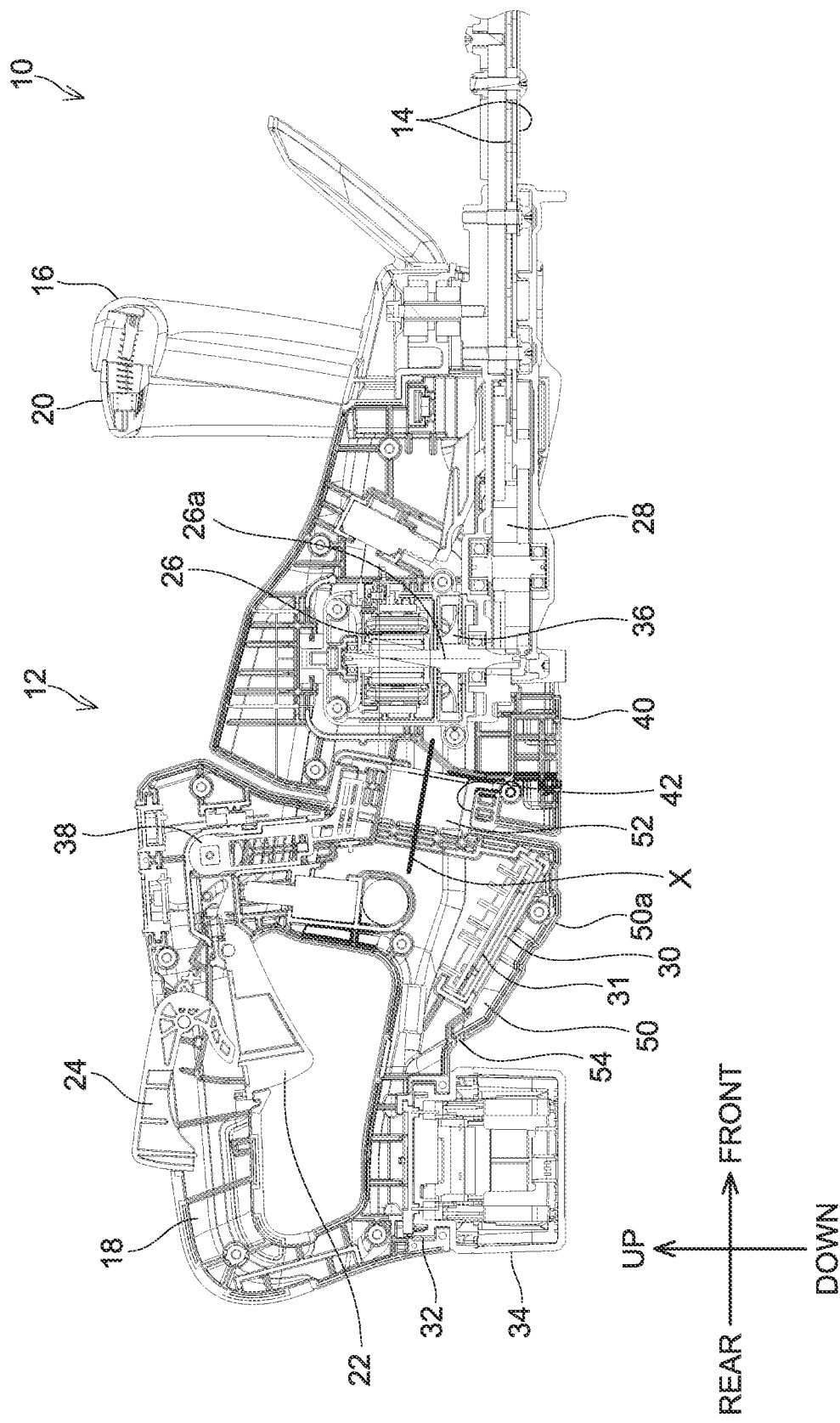
FIG. 3 is a cross-sectional view showing an internal structure of the hedge trimmer 10 of the embodiment.

As shown in FIG. 3, the hedge trimmer 10 further comprises a motor 26. The motor 26 is housed in the housing 12 and is configured to drive the pair of shear blades 14. In this respect, the motor 26 is connected to the pair of shear blades 14 via a crank cam 28 and is configured to reciprocate both of the shear blades 14 in the pair. In another embodiment, the motor 26 may be configured to reciprocate only one of the shear blades 14 in the pair. The motor 26 of the present embodiment is a brushless motor, although no particular limitation is placed thereto. A rotary shaft of the motor 26 is vertical to the longitudinal direction of the pair of shear blades 14 and extends in the up-down direction.

The hedge trimmer 10 further comprises an electric circuit unit 30 and a battery interface 32. The electric circuit unit 30 is housed in the housing 12 and is configured to control power supplied to the motor 26. For example, when the user manipulates the first drive switch 20 and the second drive switch 22, the electric circuit unit 30 starts power supply to the motor 26, and when the manipulation of the first drive switch 20 and the second drive switch 22 is released, the electric circuit unit 30 stops the power supply to the motor 26. Further, the electric circuit unit 30 can change a rotation speed of the motor 26 by controlling the power supplied to the motor 26.

The battery interface 32 is configured to detachably receive a battery pack 34 and electrically connect the attached battery pack 34 to the electric circuit unit 30. Thereby, power from the battery pack 34 is supplied to the motor 26 via the electric circuit unit 30. Since the motor 26 is a brushless motor in the present embodiment, the electric circuit unit 30 includes an inverter circuit 31. The inverter circuit 31 is provided electrically between the battery interface 32 and the motor 26, and is configured to convert DC power from the battery pack 34 to AC power and supply the converted power to the motor 26.

In the hedge trimmer 10 of the present embodiment, the rear handle 18 is provided at an upper portion of the housing 12 in rear of the motor 26. Further, the electric circuit unit 30 is located under the rear handle 18 in the rear of the motor 26. According to such a configuration, the hedge trimmer 10 easily becomes stable by a weight of the electric circuit unit 30 and the user who is gripping the rear handle 18 can easily operate the hedge trimmer 10. Further, since there is a large space inside the housing 12 under the rear handle 18, the electric circuit unit 30, which is relatively large in size, can be housed therein without increasing a size of the housing 12.

In addition, when the electric circuit unit 30 is located in the rear of the motor 26, the size of the housing 12 can be made small in front of the motor 26. When a portion of the housing 12 that is located near the pair of shear blades 14 is small in size, the user of the hedge trimmer 10 can visibly check the pair of shear blades 14 easily without interference of the housing 12.

The housing 12 of the present embodiment comprises a first housing 40 and a second housing 50, although no particular limitation is placed thereto. The second housing 50 is rotatably connected to the first housing 40. In this respect, as shown in FIG. 3, the second housing 50 is provided with a shaft portion 52 having a tubular shape, and the first housing 40 is provided with a shaft receiving hole 42 into which the shaft portion 52 is inserted. Thereby, the second housing 50 is configured to be rotatable with respect to the first housing 40 about a central axis X of the shaft portion 52, which is a rotary axis of the second housing 50. The central axis X of the shaft portion 52 (i.e., the rotary axis of the second housing 50 with respect to the first housing 40) slightly inclines to the longitudinal direction of the pair of shear blades 14 (i.e., the front-rear direction), although this is merely an example.

Usually, rotation of the second housing 50 with respect to the first housing 40 is prohibited by a second lock switch 38. That is, when the user manipulates the second lock switch 38, the rotation of the second housing 50 with respect to the first housing 40 is allowed, and when the user releases the manipulation of the second lock switch 38, the rotation of the second housing 50 with respect to the first housing 40 is prohibited. By changing angles of the second housing 50 with respect to the first housing 40, the user can control orientation of the pair of shear blades 14, for example, in accordance with surfaces of a hedge to be cut.

The first housing 40 supports the pair of shear blades 14 and houses the motor 26. Specifically, the pair of shear blades 14 is attached to a lower portion of the first housing 40. The second housing 50 comprises the rear handle 18 and houses the electric circuit unit 30. The front handle 16 is attached to the first housing 40 and extends in a ring shape above the first housing 40. However, in another embodiment, the housing 12 may be constituted of a single housing only. The technique disclosed herein, especially, the configuration where the electric circuit unit 30 is located under the rear handle 18, can be employed in a hedge trimmer including a single housing as well as in a swing-type hedge trimmer including two or more housings.

The pair of shear blades 14 extends forward from the first housing 40, although no particular limitation is placed thereto. Further, the second housing 50 is located in rear of the first housing 40. That is, the first housing 40 and the second housing 50 are arranged along the front-rear direction generally. Then, as described above, the rotary axis of the second housing 50 with respect to the first housing 40 (i.e., the central axis X of the shaft portion 52) is angled to the longitudinal direction of the pair of shear blades 14 (i.e., the front-rear direction). In another embodiment, however, the rotary axis of the second housing 50 with respect to the first housing 40 may be parallel to the front-rear direction.

In the present embodiment, the electric circuit unit 30 is located on a rearward extension line of the pair of shear blades 14. According to such a configuration, the electric circuit unit is arranged near a bottom wall 50a of the second housing 50, by which the hedge trimmer 10 becomes more stable by the weight of the electric circuit unit 30. In addition, the electric circuit unit 30 is arranged so as to incline with respect to the extension line. According to such a configuration, the size of the housing 12 (especially, the second housing 50) in the front-rear direction can be made small. The electric circuit unit 30 of the present embodiment has a substantially flat-plate outer shape. The battery pack 34 attached to the battery interface 32 is also located on the rearward extension line of the pair of shear blades 14, and the electric circuit unit 30 is located between the pair of shear blades 14 and the battery pack 34.

In the present embodiment, the battery interface 32 is located at a lower portion of the second housing 50. According to such a configuration, the hedge trimmer 10 easily becomes stable by a weight of the battery pack 34 and the user who is gripping the rear handle 18 can easily operate the hedge trimmer 10. Here, the battery interface 32 is configured to slidably receive the battery pack 34. Further, a sliding direction of the battery pack 34 at the battery interface 32 is vertical to the longitudinal direction of the pair of shear blades 14 and is parallel to the right-left direction. Usually, the slide-type battery pack 34 is large in size in its sliding direction. Therefore, when the sliding direction of the battery pack 34 at the battery interface 32 is vertical to the longitudinal direction of the pair of shear blades 14, a size of the hedge trimmer 10 in the front-rear direction can be made small.

Figure 4:
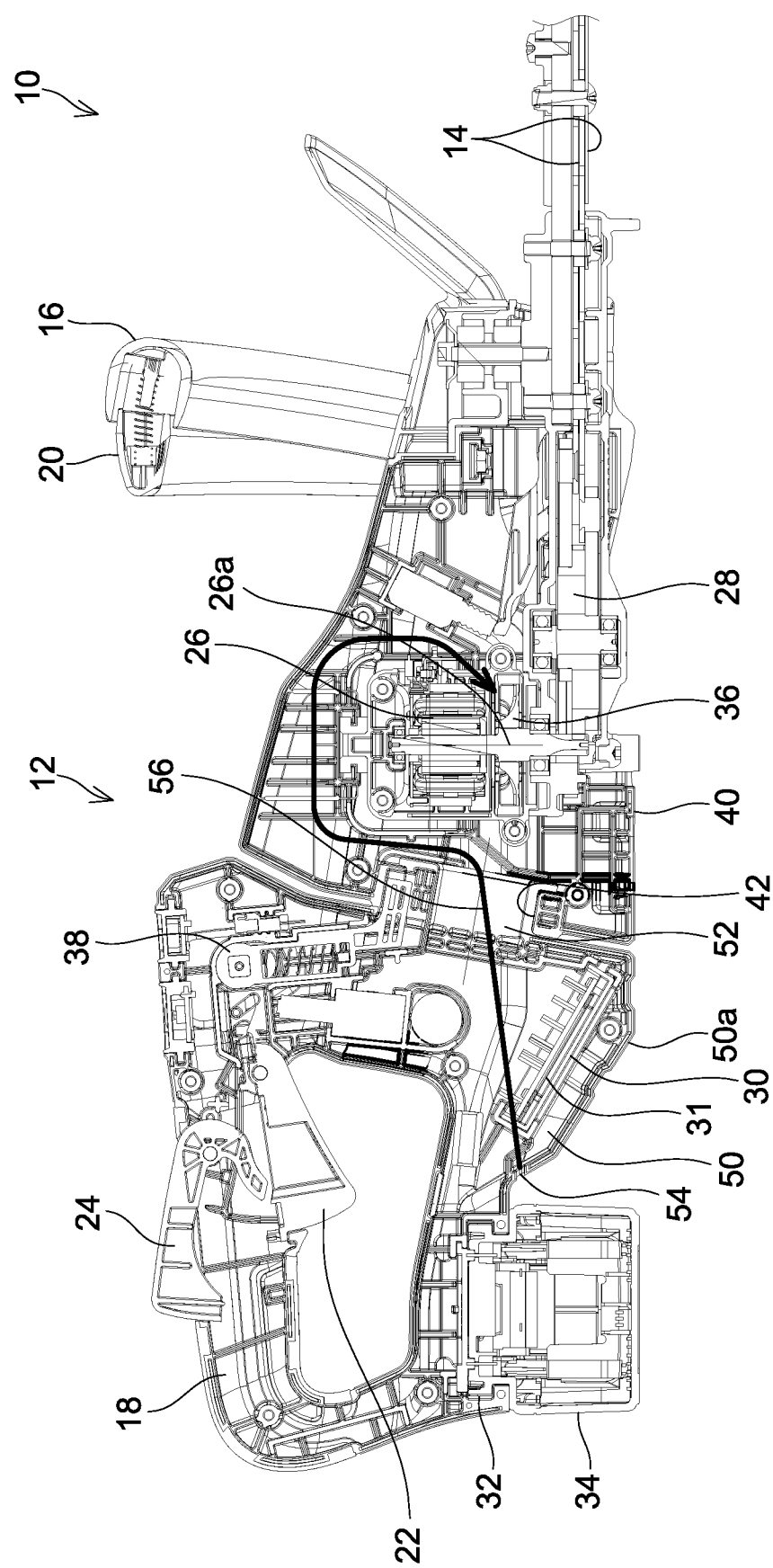
FIG. 4 is the cross-sectional view showing the internal structure of the hedge trimmer 10 of the embodiment, which especially shows a cooling air passage 56.

As shown in FIGS. 3 and 4, the hedge trimmer 10 of the present embodiment further comprises a cooling fan 36. The cooling fan 36 is housed in the first housing 40 and is configured to be driven by the motor 26. The cooling fan 36 is fixed to an output shaft 26a of the motor 26, and cooling air from the cooling fan 36 mainly cools the motor 26. In addition, the hedge trimmer 10 of the present embodiment further comprises a cooling air passage 56 which extends from an air intake 54 provided in the second housing 50 to the cooling fan 36 in the first housing 40 (see FIG. 4). This cooling air passage 56 houses at least a part of the electric circuit unit 30 therein. According to such a configuration, the electric circuit unit 30 disposed in the second housing 50 can be cooled by the cooling fan 36 disposed in the first housing 40. Since there is no need to provide a fan or a motor to drive the fan in the second housing 50, increase in a weight of the hedge trimmer 10 and deterioration of weight balance therein can be avoided.

The air intake 54 of the second housing 50 is provided in the bottom wall 50a of the second housing 50 and is located near the electric circuit unit 30, although this is merely an example. No particular limitation is placed to a number or a size of the air intake 54. Further, the cooling air passage 56 passes through inside of the shaft portion 52 of the second housing 50 and extends into inside of the first housing 40. That is, the shaft portion 52 has a tubular shape, and a through hole penetrating inside of the shaft portion 52 constitutes a part of the cooling air passage 56.

Generally speaking, it is preferable to house the electric circuit unit 30 in the first housing 40, because the electric circuit unit 30 can thereby be disposed near the motor 26. However, when the electric circuit unit 30 is housed in the first housing 40, it is difficult to downsize the first housing 40. The first housing 40 supports the pair of shear blades 14 and is located near the pair of shear blades 14. Therefore, if the size of the first housing 40 is large, the user of the hedge trimmer 10 has difficulty in visually checking the pair of shear blades 14 due to interference of the first housing 40. In this respect, the hedge trimmer 10 of the present embodiment houses the electric circuit unit 30 in the second housing 50, by which the size of the first housing 40 can be made small. The user can visually check the pair of shear blades 14 easily and can operate the hedge trimmer 10 easily.

Based on the technical standpoint above, a hedge trimmer (10) disclosed herein comprises a pair of shear blades (14), a motor (26) configured to drive at least one of the pair of shear blades, a first housing (40) supporting the pair of shear blades and housing the motor, a second housing (50) rotatably connected to the first housing and comprising a handle (18) configured to be gripped by a user, and an electric circuit unit (30) housed in the second housing and configured to control power supplied to the motor.

What is claimed is:
1. A hedge trimmer comprising:
   a housing comprising a handle configured to be gripped by a user;
   a pair of shear blades extending forward from the housing in a blade longitudinal direction;

a motor housed in the housing and configured to drive at least one of the pair of shear blades;

a power interface disposed on the housing and configured to receive electric power from a power source; and an electric circuit unit housed in the housing and electrically disposed between the power interface and the motor, the electric circuit unit being configured to control the electric power supplied from the power interface to the motor, wherein the handle is provided at an upper portion of the housing in rear of the motor, wherein the handle includes a drive switch operable by a user to cause the electric circuit unit to supply power to the motor, and the electric circuit unit is located under the handle in the rear of the motor such that a vertical line perpendicular to the blade longitudinal direction penetrates both the drive switch and the electric circuit unit, in order to dispose a weight of the electric circuit unit under the handle, and the electric circuit unit is arranged so as to incline downwardly toward the pair of shear blades.

2. The hedge trimmer according to claim 1, wherein the housing comprises a first housing and a second housing rotatably connected to the first housing, the first housing supports the pair of shear blades and houses the motor, and the second housing comprises the handle and houses the electric circuit unit and the power interface.

3. The hedge trimmer according to claim 2, wherein the pair of shear blades extends forward from the first housing in the blade longitudinal direction, and the second housing is located in rear of the first housing in the blade longitudinal direction.

4. The hedge trimmer according to claim 3, wherein the electric circuit unit is located on a rearward extension line of the pair of shear blades, the rearward extension line is parallel with the blade longitudinal direction and the rearward extension line penetrates the pair of shear blades.

5. The hedge trimmer according to claim 2, wherein:

the power interface is a battery interface configured to detachably receive a battery pack, wherein the battery interface is located at a lower portion of the second housing.

6. The hedge trimmer according to claim 2, further comprising:

a cooling fan housed in the first housing and configured to be driven by the motor; and a cooling air passage extending from an air intake provided in the second housing to the cooling fan housed in the first housing.

7. The hedge trimmer according to claim 6, wherein the cooling air passage houses at least a part of the electric circuit unit in the second housing.

8. The hedge trimmer according to claim 1, wherein the motor is a brushless motor, and the electric circuit unit comprises an inverter circuit electrically connected to the brushless motor.

9. The hedge trimmer according to claim 1, wherein the motor comprises a rotary output shaft extending in a direction perpendicular to the blade longitudinal direction.

10. The hedge trimmer according to claim 1, wherein the power interface is a battery interface configured to detachably receive a battery pack such that the vertical line does not penetrate the battery pack attached to the battery interface when the vertical line penetrates both the drive switch and the electric circuit unit.

11. The hedge trimmer according to claim 1, wherein the electric circuit unit is located on a rearward extension line of the pair of shear blades, the rearward extension line is parallel with the blade longitudinal direction and the rearward extension line penetrates the pair of shear blades.

12. The hedge trimmer according to claim 11, wherein the power interface is a battery interface configured to detachably receive a battery pack such that the rearward extension line further penetrates the battery pack attached to the battery interface.

13. The hedge trimmer according to claim 1, wherein the motor comprises a rotary output shaft extending in a direction perpendicular to the blade longitudinal direction, the electric circuit unit is located on a rearward extension line of the pair of shear blades, the rearward extension line is parallel with the blade longitudinal direction and the rearward extension line penetrates the pair of shear blades and the electric circuit unit, and the power interface is a battery interface configured to detachably receive a battery pack such that (i) the rearward extension line further penetrates the battery pack attached to the battery interface and (ii) the vertical line does not penetrate the battery pack attached to the battery interface when the vertical line penetrates both the drive switch and the electric circuit unit.

* * * * *